United States Patent
Yamaura

(10) Patent No.: US 9,470,125 B2
(45) Date of Patent: Oct. 18, 2016

(54) GAS-LIQUID SEPARATOR FOR VEHICLE-MOUNTED FUEL CELL

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 126 days.

(21) Appl. No.: 14/509,469

(22) Filed: Oct. 8, 2014

(65) Prior Publication Data

US 2015/0107198 A1  Apr. 23, 2015

(30) Foreign Application Priority Data

Oct. 17, 2013  (JP) .................. 2013-216537

(51) Int. Cl.
| | | |
|---|---|---|
| B60K 1/00 | (2006.01) | |
| B60K 1/04 | (2006.01) | |
| F01N 3/02 | (2006.01) | |
| F16T 1/34 | (2006.01) | |
| H01M 8/04 | (2016.01) | |

(52) U.S. Cl.
CPC . *F01N 3/02* (2013.01); *F16T 1/34* (2013.01); *H01M 8/04164* (2013.01); *H01M 2250/20* (2013.01); *Y02E 60/50* (2013.01); *Y02T 90/32* (2013.01)

(58) Field of Classification Search
CPC .......... B60K 1/00; B60K 1/04; B60K 13/04; B60K 2001/005; B60L 11/18; H01M 8/04156; H01M 8/04291; Y02T 90/32; Y02E 60/50

USPC .............................. 55/385.1, 385.3; 210/359
See application file for complete search history.

(56) References Cited

U.S. PATENT DOCUMENTS

2007/0007194 A1\* 1/2007 Yoshida ................... B60K 1/00
210/359

FOREIGN PATENT DOCUMENTS

| JP | 2006-120503 | 5/2006 |
|---|---|---|
| JP | 2010-234289 | 10/2010 |

\* cited by examiner

*Primary Examiner* — Jacob T Minskey
*Assistant Examiner* — Minh-Chau Pham
(74) *Attorney, Agent, or Firm* — Greenblum & Bernstein, P.L.C.

(57) ABSTRACT

A gas-liquid separator separates water from exhaust gas discharged from a fuel cell mounted in a vehicle after the fuel cell generates electricity. The gas-liquid separator includes a case that includes a water storage region. The water storage region is located at a lowermost part in the case. The exhaust gas is introduced into the case, where water is separated from the exhaust gas. After the separated water is stored in the water storage region, the water is drained to the outside from the case. The case has in it a barrier that is formed to protrude upward to restrict water from flowing out of the water storage region when the vehicle is inclined. The barrier restricts outflow of water to the outside of the water storage region when the vehicle is inclined.

5 Claims, 2 Drawing Sheets

GAS-LIQUID SEPARATOR FOR VEHICLE-MOUNTED FUEL CELL

BACKGROUND OF THE INVENTION

The present invention relates to a gas-liquid separator for a vehicle-mounted fuel cell.

Vehicles having a fuel cell are equipped with a gas-liquid separator, which separates water from exhaust gas discharged from the fuel cell after the fuel cell generates electricity. Such a gas-liquid separator has a case into which exhaust gas is introduced. Water is separated from the exhaust gas in the case. The water is then drained to the outside from a water storage region located at the lowermost part of the case. However, when the vehicle is inclined, the water stored in the water storage region can flow out to regions in the case other than the water storage region. This may adversely affect the drainage of water from the water storage region to the outside of the case.

The gas-liquid separator disclosed in Japanese Laid-Open Patent Publication No. 2010-234289 has a water-absorbing sheet that blocks the water storage region in the case. This restricts outflow of water from the water storage region when the vehicle is inclined. The gas-liquid separator disclosed in Japanese Laid-Open Patent Publication No. 2006-120503 has a partition plate having small through holes that blocks the water storage region in the case. This restricts outflow of water from the water storage region when the vehicle is inclined. Such restriction of outflow of water from the water storage region when the vehicle is inclined as in the above documents reduces adverse influence of the outflow on the drainage of water to the outside of the case.

If the water storage region is blocked with the sheet of Japanese Laid-Open Patent Publication No. 2010-234289 or with the partition plate of Japanese Laid-Open Patent Publication No. 2006-120503, outflow of water from the water storage region is restricted when the vehicle is inclined. However, the formation and installment of the sheet or the partition plate inevitably complicates the structure of the gas-liquid separator.

SUMMARY OF THE INVENTION

Accordingly, it is an objective of the present invention to provide a gas-liquid separator that is capable of restricting outflow of water from a water storage region when a vehicle is inclined and capable of suppressing complication of the structure of the gas-liquid separator.

To achieve the foregoing objective and in accordance with one aspect of the present invention, a gas-liquid separator is provided that is used for separating water from exhaust gas discharged from a fuel cell mounted in a vehicle after the fuel cell generates electricity. The gas-liquid separator includes a case that includes a water storage region. The water storage region is located at a lowermost part in the case. The exhaust gas is introduced into the case, where water is separated from the exhaust gas. After the separated water is stored in the water storage region, the water is drained to the outside from the case. The case has in it a barrier that is formed to protrude upward. The barrier restricts water from flowing out of the water storage region when the vehicle is inclined.

According to the above described configuration, the case has in it a barrier projecting upward. The barrier restricts outflow of water to the outside of the water storage region when the vehicle is inclined. Further, since the configuration is accomplished simply by forming the barrier in the case, the structure of the gas-liquid separator is not complicated.

The present invention provides a gas-liquid separator that is capable of restricting outflow of water from a water storage region when a vehicle is inclined and capable of suppressing complication of the structure of the gas-liquid separator.

DETAILED DESCRIPTION OF THE PREFERRED EMBODIMENTS

A gas-liquid separator 1 according to one embodiment of the present invention will now be described with reference to FIGS. 1 to 3.

Figure 1:
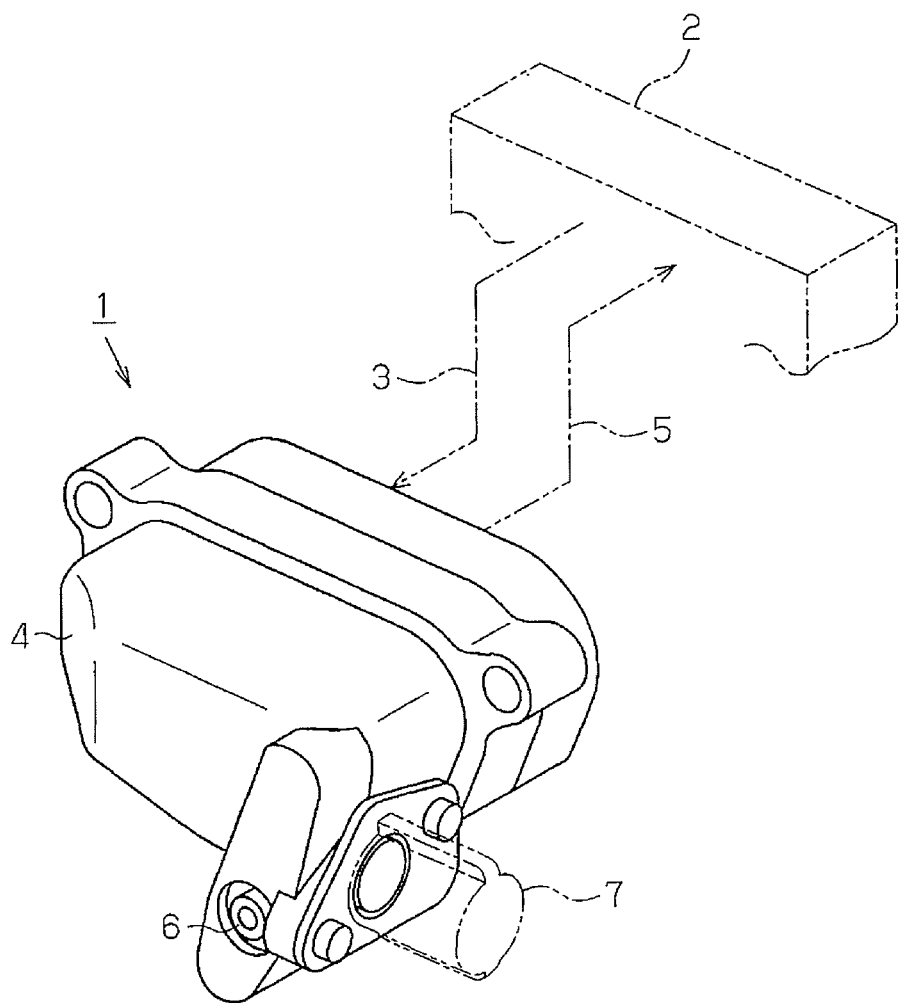
FIG. 1 is a perspective view illustrating a vehicle-mounted gas-liquid separator and its surroundings.

The gas-liquid separator 1, which is illustrated in FIG. 1, is mounted in a vehicle such as an automobile having a fuel cell 2. The fuel cell 2 generates electricity by reacting a negative electrode active material (hydrogen, for example) with a positive electrode active material (oxygen in the air, for example). After generation of electricity by reaction of the materials, exhaust gas discharged by the fuel cell 2 is delivered to the gas-liquid separator 1.

The gas-liquid separator 1 includes a case 4. After the fuel cell 2, which is mounted in the vehicle, generates electricity, exhaust gas from the fuel cell 2 is introduced into the case 4 via an introduction pipe 3. In the case 4, water contained in exhaust gas is separated from the exhaust gas. The exhaust gas from which water has been separated in the case 4 contains substances such as hydrogen that has not been used for generating electricity. The exhaust gas is thus returned to the fuel cell 2 from the case 4 via an outlet pipe 5 to be used for generating electricity. The case 4 has a drainage port 6 for draining water separated from exhaust gas to the outside. The case 4 also has a valve 7, which periodically and selectively switches the drainage port 6 between an opened state and a closed state, for example, at predetermined time intervals.

Figure 2:
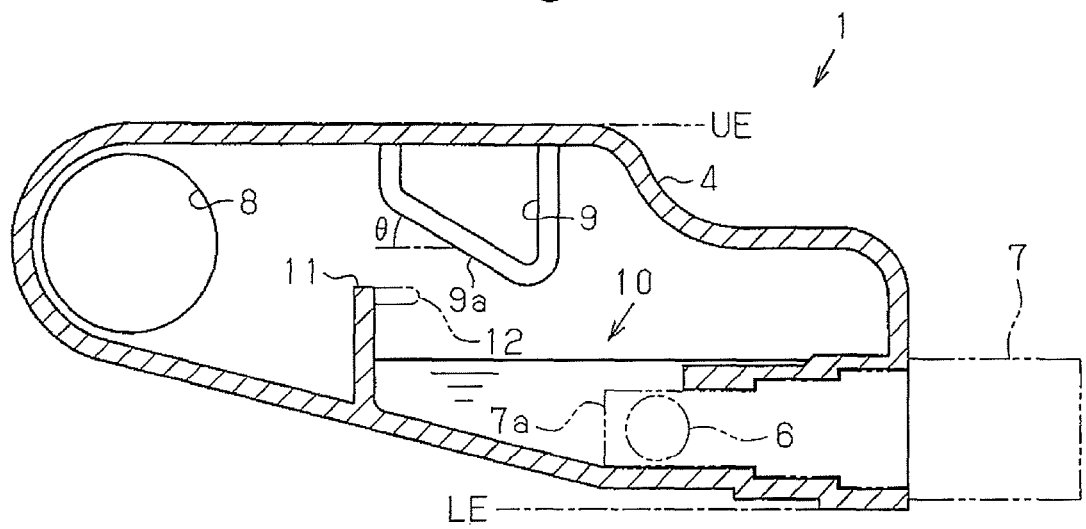
FIG. 2 is a cross-sectional view illustrating the inner structure of the gas-liquid separator.

As shown in FIG. 2, the case 4 of the gas-liquid separator 1 has an exhaust gas inlet 8, which is used for introducing exhaust gas into the case 4 and has a required exhaust passage area. The case 4 of the gas-liquid separator 1 has an exhaust gas outlet 9, which is used for discharging exhaust gas from which water has been separated to the outside of the case 4 and has a required exhaust passage area. The exhaust gas inlet 8 and the exhaust gas outlet 9 are formed to be located between an upper end UE and a lower end LE of the case 4, such that introduction and discharge of exhaust gas into and from the case 4 is performed in the horizontal direction of the case 4. In the gas-liquid separator 1 of the present embodiment, the exhaust gas inlet 8 and the exhaust gas outlet 9 are located close to the upper end UE of the case 4. As shown in FIGS. 1 and 2, the introduction pipe 3 is connected to the exhaust gas inlet 8, and the outlet pipe 5 is connected to the exhaust gas outlet 9.

The lowermost part of the case 4 serves as a water storage region 10 for storing water separated from exhaust gas. The water storage region 10 is located at the right end in the case 4 as viewed in FIG. 2. When the gas-liquid separator 1 installed in the vehicle, the water storage region 10 is arranged to face the front end of the vehicle. The drainage port 6 is formed at a lower part of the water storage region 10 to drain, in the horizontal direction of the case 4, water stored in the water storage region 10 to the outside of the case 4. The valve 7, which selectively switches the drainage port 6 between the open state and the closed state, is located in a part of a side wall of the case 4 between the upper end UE and the lower end LE. When a valve member 7a of the valve 7 is moved toward the front end or the rear end of the vehicle (leftward or rightward as viewed in FIG. 2), the drainage port 6 is selectively switched between the open state and the closed state.

When the gas-liquid separator 1 is installed in the vehicle, the exhaust gas inlet 8 is located at the end closer to the rear end of the vehicle (the left end as viewed in FIG. 2). That is, the position of the exhaust gas inlet 8 in the front-rear direction of the vehicle is determined such that the exhaust gas inlet 8 is located at the above described position. The case 4 has a barrier 11 that is formed to protrude upward at a part of the bottom surface between the water storage region 10 and the exhaust gas inlet 8. When the vehicle is inclined, the barrier 11 restricts outflow of water from the water storage region 10. As indicated by a long dashed double-short dashed line, an overhang 12 may be formed at the upper end of the barrier 11. In that case, the overhang 12 is formed to protrude from the upper end of the barrier 11 toward the front end of the vehicle (rightward as viewed in FIG. 2). In other words, the overhang 12 is formed to cover over at least part of the surface of water in the water storage region 10.

When the gas-liquid separator 1 is installed in the vehicle, the exhaust gas outlet 9 is located closer to the front end of the vehicle (closer to the right end as viewed in FIG. 2), at a higher position than the upper end of the barrier 11 and above the water storage region 10. That is, the position of the exhaust gas outlet 9 in the front-rear direction and the vertical direction of the vehicle is determined such that the exhaust gas outlet 9 is located at the above described position. A lower surface 9a of the exhaust gas outlet 9, or a surface of the exhaust gas outlet 9 that faces the surface of water in the water storage region 10, is inclined such that, when the vehicle is inclined in the front-rear direction, the lower surface 9a approaches a parallel state with the surface of water in the water storage region 10. The lower surface 9a of the exhaust gas outlet 9 in this example is inclined such that the lower surface 9a approaches a parallel state with the surface of water in the water storage region 10 when the vehicle is inclined upward toward the front end. That is, the inclination angle θ of the lower surface 9a with respect to the horizontal plane is determined such that the lower surface 9a is inclined in the above described manner.

Figure 3:
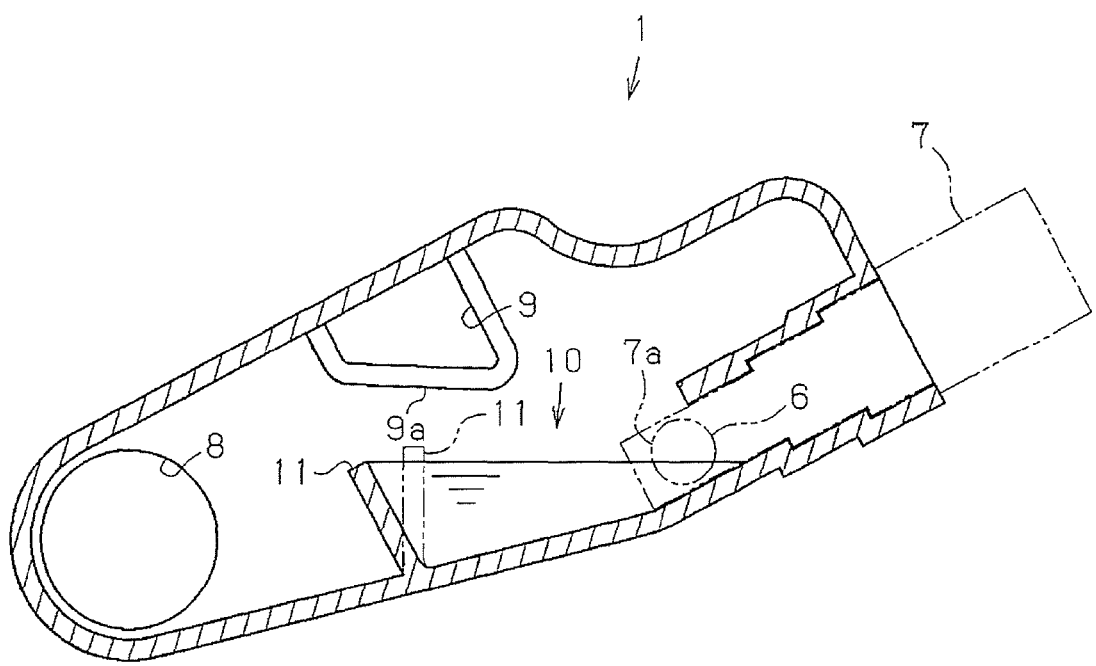
FIG. 3 is a cross-sectional view illustrating a state in which the gas-liquid separator is inclined due to an inclination of the vehicle.

FIG. 3 illustrates the positional relationship between the surface of water in the water storage region 10 and the lower surface 9a of the exhaust gas outlet 9 when the vehicle is inclined upward toward the front end.

Operation of the gas-liquid separator 1 will now be described.

Exhaust gas from the fuel cell 2 shown in FIG. 1 is introduced into the case 4 of the gas-liquid separator 1 shown in FIG. 2 via the exhaust gas inlet 8. After being introduced into the case 4, the exhaust gas flows toward the exhaust gas outlet 9 located above the water storage region 10, while water contained in the exhaust gas is separated from the exhaust gas. The exhaust gas, from which water has been separated, is discharged to the outside of the case 4 via the exhaust gas outlet 9 shown in FIG. 2 and returned to the fuel cell 2 shown in FIG. 1.

The water that has been separated from the exhaust gas in the case 4 trickles down due to the gravity and collects in the water storage region 10. When the valve 7 is activated to open the drainage port 6 with water stored in the water storage region 10, the water in the water storage region 10 is drained to the outside of the case 4 via the drainage port 6.

When the vehicle is inclined in the front-rear direction as shown in FIG. 3, for example, when the vehicle is inclined upward toward the front end, the gas-liquid separator 1 is inclined. If the gas-liquid separator 1 did not have the barrier 11, the water stored in the water storage region 10 would flow out of the region 10, and the lower end of the drainage port 6 might be exposed entirely above the surface of water in the water storage region 10. In such a state, even if the valve 7 is activated to open the drainage port 6, the water would not be drained to the outside of the case 4 via the drainage port 6.

In contrast, the case 4 has on the bottom surface the integrally formed barrier 11, which protrudes upward. In the gas-liquid separator 1 according to the present embodiment, the barrier 11 is formed to restrict outflow of water from the water storage region 10. When the vehicle is inclined, the lower end of the drainage port 6 is prevented from being exposed above the surface of water in the water storage region 10. As a result, water is readily drained to the outside of the case 4 from the drainage port 6.

Since the water is restricted from flowing out from the water storage region 10 simply by providing the barrier 11 in the case 4, the structure of the gas-liquid separator 1 is not complicated.

The above described embodiment has the following advantages.

(1) The gas-liquid separator 1 is capable of restricting outflow of water from the water storage region 10 when a vehicle is inclined. Also, complication of the structure of the gas-liquid separator 1 is suppressed.

(2) The exhaust gas outlet 9, which discharges exhaust gas from the case 4 in the horizontal direction of the case 4, is formed above the water storage region 10 and at a higher position than the upper end of the barrier 11. Further, the lower surface 9a of the exhaust gas outlet 9 is inclined relative to the horizontal direction of the case 4, that is, the front-rear direction of the vehicle by the inclination angle θ, such that the lower surface 9a approaches a parallel state with the surface of water in the water storage region 10 when the vehicle is inclined upward toward the front end. Therefore, when the vehicle is inclined upward toward the front end due to acceleration or hill-climbing, the lower surface 9a of the exhaust gas outlet 9 approaches a state parallel with the surface of water in the water storage region 10, which retains water using the barrier 11. This increases the distance between the surface of water in the water storage region 10 and the lower surface 9a of the exhaust gas outlet 9 as great as possible.

In a case in which the gas-liquid separator 1 is installed in an electric vehicle, which travels using electricity generated by the fuel cell 2, the flow rate of exhaust gas from the fuel cell 2 increases when the drive force of the vehicle increases, for example, due to acceleration or hill-climbing. This intensifies the flow of exhaust gas in the case 4, and the intensified gas flow makes it likely that water in the water storage region 10 will enter the exhaust gas outlet 9. However, when the vehicle is inclined upward toward the front end due to acceleration or hill-climbing, the distance between the surface of water in the water storage region 10 and the lower surface 9a of the exhaust gas outlet 9 is increased as great as possible. Therefore, when exhaust gas that has been introduced into the case 4 via the exhaust gas inlet 8 is discharged to the outside of the case 4 via the exhaust gas outlet 9, the flow of the exhaust gas is restricted from causing the water in the water storage region 10 to enter the exhaust gas outlet 9.

(3) In the vehicle, the gas-liquid separator 1 is located at a position lower than the fuel cell 2, so that the gas-liquid separator 1 can separate water from the exhaust gas from the fuel cell 2 and retain the separated water in the gas-liquid separator 1. On the other hand, to prevent the gas-liquid separator 1 from contacting the road surface on which the vehicle travels and to avoid pebbles flying toward the gas-liquid separator 1, a space needs to be provided between the road surface and the gas-liquid separator 1. Accordingly, the space in which the gas-liquid separator 1 can be installed is limited to a small range in the vertical direction of the vehicle. To contain the gas-liquid separator 1 in such a limited space, the gas-liquid separator 1 and its peripheral devices are preferably compact in the vertical direction.

To respond to such a demand, the drainage port 6 is formed in the case 4 to cause water to flow in the horizontal direction of the case 4, and the exhaust gas inlet 8 and the exhaust gas outlet 9 are formed in the case 4 to cause exhaust gas to flow in the horizontal direction of the case 4. Further, the drainage port 6, the exhaust gas inlet 8, and the exhaust gas outlet 9 are each formed in the case 4 to be located between the upper end UE and the lower end LE of the case 4. This reduces, as much as possible, the amount of downward protrusion from the lower end LE of the valve 7, which is provided to correspond to the position of the drainage port 6, and reduces, as much as possible, the amount of upward protrusion from the upper end UE of the introduction pipe 3 and the outlet pipe 5, which are connected to the exhaust gas inlet 8 and the exhaust gas outlet 9, respectively. As a result, the gas-liquid separator 1 and its peripheral devices are formed to be compact in the vertical direction.

(4) The valve 7, which selectively switches the drainage port 6 between the open state and the closed state, is located in a part of a side wall of the case 4 between the upper end UE and the lower end LE. Therefore, the gas-liquid separator 1 is prevented from being expanded in the vertical direction due to upward and downward protrusion of the valve 7 from the upper end UE and the lower end LE of the case 4.

(5) In a case in which the overhang 12 is formed at the upper end of the barrier 11 to cover over a part of the surface of water in the water storage region 10 as indicated by a long dashed double-short dashed line in FIG. 2, if exhaust gas flows from the exhaust gas inlet 8 to the exhaust gas outlet 9 in the case 4, the exhaust gas is prevented from striking the surface of water in the water storage region 10 and causing the water to splash. Thus, little splashed water enters the exhaust gas outlet 9 due to the flow of exhaust gas. Further, when the vehicle is inclined upward toward the front end, the overhang 12 effectively restricts the water in the water storage region 10 from flowing to the exhaust gas outlet 9.

(6) In the structure for restricting outflow of water from the water storage region 10, the gas-liquid separator 1 has no sections such as clearances where small amount of water can collect. Thus, water is not frozen in such sections in the winter season. A section in which a sufficient amount of water exists such as the water storage region 10 will not be frozen even during the winter season. This prevents water in the water storage region 10 from being retained in the case 4 without being drained during the winter season.

The above described embodiment may be modified as follows.

As shown in FIG. 2, the barrier 11 is formed to be perpendicular to the case 4 and protrude upward with reference to the state where the vehicle is in a horizontal position. Instead, as indicated by a long dashed double-short dashed line in FIG. 3, the barrier 11 may be formed to protrude upward and toward the front end of the vehicle with reference to the state where the vehicle is inclined upward toward the front end of the vehicle.

The overhang 12 does not necessarily provided.

The valve 7 may protrude further downward than the lower end LE.

The drainage port 6 may be formed such that the water drained out of the case 4 from the drainage port 6 flows in a direction other than the horizontal direction of the case 4.

The exhaust gas inlet 8 and the exhaust gas outlet 9 may be formed such that the exhaust gas flowing therethrough flow in a direction other than the horizontal direction of the case 4.

The drainage port 6, the exhaust gas inlet 8, and the exhaust gas outlet 9 may be formed in regions outside the region between the upper end UE and the lower end LE of the case 4.

The gas-liquid separator 1 may be arranged in the vehicle such that the water storage region 10 is located closer to the rear end of the vehicle. In this case, the barrier 11 restricts outflow of water from the water storage region 10 when the vehicle is inclined downward toward the front end. Further, in this case, when the vehicle is inclined upward toward the front end, the lower surface 9a of the exhaust gas outlet 9 is inclined relative to the horizontal direction of the case 4 (the front-rear direction of the vehicle), such that the lower surface 9a approaches a parallel state with the surface of water in the water storage region 10, in which water is retained by the barrier 11.

The lower surface 9a of the exhaust gas outlet 9 does not necessarily need to be inclined with respect to the horizontal direction of the case 4.

The exhaust gas outlet 9 of the case 4 may be formed in a region other than the region above the water storage region 10. In this case, the position of the exhaust gas outlet 9 does not necessarily need to be at a higher position than the upper end of the barrier 11.

The positions where the exhaust gas inlet 8 and the exhaust gas outlet 9 are formed may be changed as necessary in the case 4.

The invention claimed is:

1. A gas-liquid separator for separating water from exhaust gas discharged from a fuel cell mounted in a vehicle after the fuel cell generates electricity, the gas-liquid separator comprising a case that includes a water storage region, wherein the water storage region is located at a lowermost part in the case, the exhaust gas is introduced into the case, where water is separated from the exhaust gas, after the separated water is stored in the water storage region, the water is drained to the outside from the case, the case has in it a barrier that is formed to protrude upward from an intermediate region of an inclined surface that partially defines the water storage region, and the barrier restricts water from flowing out of the water storage region when the vehicle is inclined.

2. The gas-liquid separator according to claim 1, wherein
the case has an exhaust gas outlet, which is located above the water storage region and at a higher position than the barrier,
the exhaust gas, from which water has been separated in the case, is discharged in the horizontal direction of the case to the outside of the case and is then returned to the fuel cell via the exhaust gas outlet, and
the exhaust gas outlet has a lower surface that is inclined such that, when the vehicle is inclined in the front-rear direction of the vehicle, the lower surface approaches a parallel state with the surface of water in the water storage region.

3. The gas-liquid separator according to claim 2, wherein the case includes
an exhaust gas inlet for introducing, in the horizontal direction of the case, the exhaust gas into the case, and
a drainage port for draining, in the horizontal direction of the case, water stored in the water storage region to the outside of the case, and
the exhaust gas inlet, the exhaust gas outlet, and the drainage port are located between an upper end and a lower end of the case.

4. The gas-liquid separator according to claim 3, wherein a valve for selectively switching the drainage port between an open state and a closed state is provided a position between the upper end and the lower end of the case.

5. The gas-liquid separator according to claim 2, wherein an overhang is formed at the upper end of the barrier, wherein the overhang covers over at least part of the surface of water in the water storage region.

* * * * *